United States Patent

Dick et al.

[11] Patent Number: 5,431,707
[45] Date of Patent: Jul. 11, 1995

[54] PROCESS FOR THE FORMATION OF A BARRIER LAYER ON A SURFACE OF A GLASS OBJECT

[75] Inventors: Recourt, Marcoussis; Cahchen Ougarane, Montigny-Le Bretonneux; all of France

[73] Assignee: L'Air Liquide, Societe Anonyme pour l'Etude et l'Exploitation des Procedes Georges Claude, Paris, France

[21] Appl. No.: 115,423

[22] Filed: Sep. 2, 1993

[30] Foreign Application Priority Data

Sep. 2, 1992 [FR] France .................... 92 10458

[51] Int. Cl.$^6$ ............................. C23C 16/34
[52] U.S. Cl. .................... 65/60.5; 65/60.8; 427/167; 427/255.2
[58] Field of Search ............. 65/60.8, 60.5, 430; 427/167, 255.2; 106/287.11 (U.S. only)

[56] References Cited

U.S. PATENT DOCUMENTS

| | | | |
|---|---|---|---|
| 3,652,331 | 3/1972 | Yamazaki | 23/182 |
| 3,717,498 | 2/1973 | Franz | 65/60.8 |
| 4,100,330 | 7/1978 | Donley | 65/60.8 |
| 4,188,444 | 2/1980 | Landau | 65/60.8 |
| 4,543,271 | 4/1985 | Peters | 427/255.3 |
| 4,780,372 | 10/1988 | Tracy | 428/428 |
| 4,781,945 | 11/1988 | Nishimura | 427/255.3 |
| 4,828,880 | 5/1989 | Jenkins | 65/60.8 |
| 4,992,309 | 2/1991 | Hochberg | 427/255.3 |
| 4,995,893 | 2/1991 | Jenkins | 65/60.5 |
| 5,162,136 | 10/1992 | Blum | 427/226 |

FOREIGN PATENT DOCUMENTS

| | | |
|---|---|---|
| 0423884 | 4/1991 | European Pat. Off. |
| 2382511 | 9/1978 | France . |
| 2666324 | 3/1992 | France . |
| 2031756 | 4/1980 | United Kingdom . |
| WO89/11920 | 12/1989 | WIPO . |

OTHER PUBLICATIONS

Tooley, Fay, The Handbook of Glass Manufacture, 1984, pp. 18–1 to 18–5.

*Primary Examiner*—W. Gary Jones
*Assistant Examiner*—John Hoffmann
*Attorney, Agent, or Firm*—Young & Thompson

[57] ABSTRACT

There is formed a silicon-base antimigration barrier layer by projection, on a hot surface of a glass object, in an unconfined ambient atmosphere from a gaseous mixture comprising neutral gas, a silicon precursor, typically a silane, between 10 and 60% of ammonia and preferably less than 5% oxygen, the ratio of the oxygen and silane contents being comprised between 0 and 4. It is useful particularly for the treatment of sodium-calcium glass receptacles to prevent migration of ions into liquids contained in the receptacles.

11 Claims, No Drawings

PROCESS FOR THE FORMATION OF A BARRIER LAYER ON A SURFACE OF A GLASS OBJECT

FIELD OF THE INVENTION

The present invention relates to a process for the formation of a barrier layer on a surface of a glass object by projection, on the hot surface of the object, of a gaseous mixture comprising a silicon precursor and a neutral gas.

BACKGROUND OF THE INVENTION

A process of this type is known from the document EP-A-O.526,344, in the name of the applicant, which describes the formation of silicon-base layers on different glass objects from a gaseous mixture comprising also oxygen of a content typically between 7 and 15%.

SUMMARY OF THE INVENTION

The present invention has for its object to provide a new process for the formation of barrier layers preventing the migration of certain ions constituting the glass, more particularly alkali ions in the case of sodium-calcium glasses and larger size ions, such as cadmium, particularly for the internal coating of receptacles or flasks adapted to contain substances that are reactive and/or sensitive to such ionic migrations.

To do this, according to one characteristic of the invention, there is projected on the hot surface a gaseous mixture comprising also at least 10%, typically between 10 and 60% preferably about 50% of ammonia.

According to more particular characteristics of the invention:

- the silicon precursor is a silane whose content in the gaseous mixture is comprised between 0.2 and 3%, typically about 1%;
- the gaseous mixture contains also oxygen at a content lower than 7%, typically lower than 5%;
- the ratio of oxygen and silane contents in the gaseous mixture is comprised between 0 and 4, typically between 0.5 and 1.5.

Other characteristics and advantages of the present invention will become apparent from the following description of embodiments given by way of amplification but not limitation.

DETAILED DESCRIPTION OF THE INVENTION

The process is practiced by supplying a nozzle or projection device, adapted to be disposed adjacent the surface or surfaces of the glass object to be coated, with a gaseous mixture containing a silicon precursor, typically a silane, and ammonia and provided from a premixture of inert gas and silane. The final gaseous mixture is projected on the surface of the glass object at a temperature between 300° C. and the temperature of formation of the glass, either during a final formation phase of the glass object or thereafter, after superficially reheating the surface of the glass object preliminarily formed. According to one aspect of the invention, the projection of the gaseous mixture on the hot surface is effected in an unconfined ambient atmosphere, typically free air. The gaseous mixture to be projected is maintained at a temperature below 200° C., typically less than 100° C., until its exit from the injection device.

The neutral carrier gas of the gaseous mixture is nitrogen, argon or a mixture of the two. The ammonia content in the projected gaseous mixture is comprised between 5 and 60%, preferably as to cost and to guarantee the formation of a dense and homogenous silicon base layer, about 50%. The gaseous precursor of silicon is a silane (monosilane, disilane, trisilane), preferably a monosilane, whose content in the projected gaseous mixture varies between 0.2 and the limit of flammability of the silane, for example about 3% in the case of the monosilane when using nitrogen as the diluent gas. As indicated in the table below, the effectiveness of the chemical barrier of the deposited layer on the glass surface is substantially increased by the presence of small quantities of oxygen, especially less than two percent, in the projected gaseous mixture, which can be explained by the fact that the silane-oxygen reaction speed is greater than the silane ammonia reaction speed. The ratio of the oxygen and silane contents is preferably less than 4, typically between 0.5 and 1.5.

The table below shows the performances of the hydrolytic resistance of the layers under different operating conditions. The test applied is the following: a sodium-calcium glass flask, in which has been injected a gaseous mixture according to the invention, is filled with distilled water then is brought to 80° C. for 48 hours. Then the sodium extracted from the glass is measured in the distilled water, for example by flame spectrometry.

|                | sodium migration µg/ml |
| --- | --- |
| Untreated blank | 9.50 |
| Treatment A | 0.50 |
| Treatment B | 0.32 |
| Treatment C | 0.18 |
| Treatment D | 0.48 |
| Treatment E | 0.36 |

Operating Conditions temperature of the glass surface: 570° C.;
flow rate of gaseous mixture: 100 liters per hour;
treatment time: 5 seconds.
treatment A: $SiH_4$: 1%, $NH_3$: 50%, $O_2$: 0%, balance N,
treatment B: $SiH_4$: 1%, $NH_3$: 50%, $O_2$: 0,5% balance N,
treatment C: $SiH_4$: 1%, $NH_3$: 50%, $O_2$: 1%, balance N,
treatment D: $SiH_4$: 1%, $NH_3$: 50%, $O_2$: 2%, balance N,
treatment E: $SiH_4$: 1%, $NH_3$: 50%, $O_2$: 4%, balance N,
Analogous results are obtained with argon.

Although the present invention has been described in relation to particular embodiments, it is not thereby limited but is on the contrary susceptible to modifications and variations which will be apparent to those skilled in the art. In particular, the injection device is preferably adapted to the geometry of the surface of the glass object to be treated so as to obtain a homogenous flow and distribution of the gaseous mixture.

What is claimed is:

1. In a process for forming a barrier layer on a surface of a glass object by projection, on a hot surface of the object, of a gaseous mixture comprising a silicon precursor and a gas selected from the group consisting of nitrogen, argon and their mixtures; the improvement wherein said gaseous mixture also contains at least 10% ammonia, and from 0.5% to 7% oxygen.

2. The process according to claim 1, wherein the gaseous mixture contains between about 10 and 60% of ammonia.

3. The process according to claim 2, wherein the gaseous mixture contains about 50% ammonia.

4. The process according to claim 1, wherein the silicon precursor is a silane whose content in the gaseous mixture is comprised between about 0.2 and 3%.

5. The process according to claim 1, wherein the oxygen content is less than 5%.

6. The process according to claim 4, wherein the silane content is about 1%.

7. The process according to claim 4, wherein the ratio of the oxygen and silane contents in the gaseous mixture is less than 4.

8. The process according to claim 7, wherein the ratio of the oxygen and silane contents is comprised between 0.5 and 1.5.

9. The process according to claim 1, wherein the gaseous mixture is maintained at a temperature below 200° C. until its projection on the hot surface.

10. The process according to claim 1, wherein the projection of the gaseous mixture on the hot surface is effected in an ambient atmosphere.

11. The process according to claim 1, wherein the glass object is a sodium-calcium glass receptacle and said surface is the internal surface of the receptacle.

* * * * *